United States Patent Office 2,827,471
Patented Mar. 18, 1958

2,827,471

PROCESS FOR PREPARING LONG-CHAIN TRIFLUOROALKANOIC ACIDS

Gilbert Gavlin and Richard G. Maguire, Chicago, Ill., assignors, by mesne assignments, to the United States of America as represented by the Secretary of the Navy No Drawing. Application February 28, 1955
Serial No. 491,236

6 Claims. (Cl. 260—408)

This invention relates to new organofluorine compounds. More particularly, this invention relates to new omega-trifluoroalkanoic acids and the corresponding amines and amides thereof and also to methods for their preparation.

Aliphatic fluorine compounds having eight or more carbon atoms in the chain and further characterized by the presence of a —$CF_3$ group at one end of the molecule and an adsorbable polar group at the other extremity thereof are highly desirable surface-active agents having both hydrophobic and organophobic properties. For example, when a long chain omega-trifluoroalkanoic acid is applied to the polished surface of a solid, such as platinum, glass, copper, etc., it has been found that an extremely high degree of nonwettability is imparted thereto as determined by contact angle measurements using various liquids.

Although such compounds are valuable as surface-active agents and for other technical applications as boundary lubricants as well as synthesis intermediates for the preparation of more complex compounds having the omega-trifluoro configuration, the long-chain members of the omega-trifluoroalkanoic acid series and the corresponding amides and amines have not been made available heretofore despite the fact that lower members of the series as, for example, omega-trifluorobutyric acid, are known. An essential part of the present invention comprises the providing of a method for utilizing the latter substance as a starting material in preparing the members of the series containing at least 8 carbon atoms in the chain without deterioration of the —$CF_3$ group therein. This is accomplished through a sequence of steps involving a number of reactions for lengthening the chain carried out under the mildest conditions consistent with a reasonable reaction rate to preclude formation of pyrolysis or degradation products and also to eliminate rearrangement or other conditions which could lead to a breakdown of the essential omega-$CF_3$ group within the molecule.

It is accordingly an object of the invention to provide new omega-trifluoroalkanoic acids and their corresponding amides and amines.

A further object of the invention is to provide a method for preparing long-chain omega-trifluoroalkanoic acids and related amides and amines from omega-trifluorobutyric acid without destroying the omega-$CF_3$ configuration of the molecule.

Another object is to provide new omega-trifluoromethyl compounds containing an adsorbable polar group on the opposite end of the molecule which compounds are excellent surface-active reagents having nonwettable characteristics and other useful properties.

Other objects and advantages will become apparent as the specification proceeds.

The new compositions of the present invention may be designated by the structural formula $CF_3(CH_2)_nY$, wherein $n$ is a positive integer from 6 to 22 and Y is a monovalent radical forming a polar group as —COOH, $CONH_2$ or $CH_2NH_2$. The preferred embodiments are the straight-chain compounds, wherein $n$ is an integer from 6 to 16 and Y is carboxylic illustrated by specific substances such as omega-trifluorooctanoic, omega-trifluorononanoic, omega-trifluorodecanoic, omega-trifluorododecanoic, omega-trifluorooctadecanoic or omega-trifluorostearic acid and the like. The corresponding amides and amines constitute specific examples of the type of omega-trifluoroalkyl amides and amines respectively coming within the scope of the present invention.

The starting material for the synthesis of the higher members of the series of omega-trifluoroalkanoic acids, omega-trifluoroalkyl amides and amines as previously indicated is omega-trifluorobutyric acid which may be prepared from such widely available materials as ethylene and carbon tetrachloride. For best results, the procedure of Joyce et al. described in the J. Am. Chem. Soc., 70, 2529 (1948), preferably modified by the use of slightly lower reaction temperatures (70 to 80° C.) may be used. The conversion of the reaction product, 1,1,1,3-tetrachloropropane, separated from the reaction mixture, to 1,1,1-trifluoro-3-chloropropane is carried out by the use of a fluorinating agent preferably consisting of a preheated mixture of antimony trifluoride and antimony pentachloride and maintaining a reaction temperature between 0 and 45° C. Formation of omega-trifluorobutyric acid from 1,1,1-trifluoro-3-chloropropane is preferably accomplished via the Grignard reaction essentially as described by McBee and Truchan in the J. Am. Chem. Soc., 70, 2911 (1948).

The chain-lengthening reactions applied to omega-trifluorobutyric acid for producing the long-chain homologues thereof without adversely affecting the omega-trifluoromethyl configuration include the following successive steps: (1) reduction of the acid to the corresponding alcohol, (2) formation of the omega-trifluoroalkyl halide therefrom, (3) preparation of the cadmium organometallic compound, (4) reacting the di-(omega-trifluoroalkyl) cadmium with an ester acid halide, and (5) reducing the keto-ester to convert the keto group to methylene and hydrolizing the ester to restore the carboxylic group. The same sequence of steps may be repeated if desired to further increase the chain length depending upon the ester acid halide used in the reaction and the number of methylene groups required. A single carbon atom may be introduced into the molecule by the well-known Grignard reaction using carbon dioxide, and this method used in conjunction with the aforesaid reactions is often suitable for obtaining the long-chain members of the series containing an odd number of carbon atoms. In each case, the amide may be prepared from the omega-trifluoroalkanoic acid by reacting the same with thionyl chloride and ammonia. Reduction of the carbonyl group to methylene provides the corresponding amino compound. Purification steps include conventional crystallization and fractionation procedures except where otherwise indicated below.

For maintaining the omega-$CF_3$ group intact during the series of reactions aimed at preparing the necessary intermediates for increasing the chain length and also for the purpose of enhancing the yields at the various stages in the synthesis, several important modifications have been found to be essential to the production of the aforesaid long-chain compounds insofar as conventional methods of synthesis are concerned. One procedural modification consists of the preparation of the omega-trifluoroalkyl bromide by adding the alcohol to phosphorus tribromide thereby reversing the conventional practice of reagent addition. By this means, dehydration and rearrangement of the alcohol by anhydrous phosphoric acid is virtually eliminated, and yields upwards of 90% or better of the desired omega-trifluoroalkyl bromide may be obtained consistently.

A second improvement leading to considerable yield increase comprises the use of solvent exchange by fractional distillation under vacuum after preparation of the di-(omega-trifluoroalkyl) cadmium compound and prior to the reaction of the same with an ester acid halide. The exchange from ether to benzene is known to decrease markedly the extent of diester formation during reaction of the organometallic compound with the ester acid halide. By avoiding the stripping of the ether from the cadmium compound to dryness, however, and utilizing reduced pressures in the solvent exchange step, previously obtained keto-ester yields ranging from 30 to 64% have been upgraded to consistent yields of from 69 to 77%.

Reduction reactions used in the chain-lengthening reactions consists of (1) the use of lithium aluminum hydride in converting the acid to the corresponding alcohol and (2) the Clemmensen procedure for reducing the carbonyl group of the keto-ester to methylene. The latter technique is essential since the generally more widely used method for similar purposes, namely, the Huang-Minlon-Wolff-Kishner procedure, resulted in the equimolar elimination of hydrogen fluoride thereby indicating destruction of the —$CF_3$ substituent in the molecule.

The ester acid halide used for condensation with the di-trifluoroalkyl cadmium compound may be represented generally by the structural formula

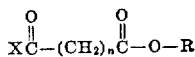

wherein X is halogen, $n$ is a positive integer from 1 to 16 and R is alkyl. The more readily available members consist of compounds wherein X is chlorine, $n$ is from 3 to 12, and R is methyl as illustrated by compounds, such as beta-carbomethoxypropionyl chloride, omega-carbomethoxynonanoyl chloride, and the like.

The isolation and purification of the various intermediates and final products are described under the following examples which illustrate the invention in further detail.

EXAMPLE I

*(Omega-trifluorooctanoic acid)*

*Preparation of omega-trifluoro-n-butyl alcohol.*—The starting material, omega-trifluorobutyric acid, having B. P. 112° C./100 mm.; M. P. 32 to 33° C. was converted to omega-trifluoro-n-butyl alcohol by adding 56.8 g. (0.4 mole) in 450 ml. of ether to a solution of 33.6 g. (0.88 mole) of lithium aluminum hydride previously refluxed for 4 to 6 hours in 1 liter of ether. An addition rate sufficient to provide gentle refluxing was used, after which external heating was applied to maintain reflux for an additional hour. Sufficient water (50 to 100 ml.) was added to decompose the excess hydride after which 1800 ml. of dilute sulfuric acid (10%) was added to dissolve the precipitated inorganic basic salts. The aqueous layer was extracted with six 100 ml. portions of ether which were added to the main ether fraction. The combined ether solution was preliminarily dried over anhydrous potassium carbonate and then over anhydrous calcium sulfate. The ether was stripped, leaving a residue of approximately 100 ml. Three such batches were combined and fractionated through a 18-inch, helix-packed column at reduced pressure, yielding 145 g. (95% yield) of the alcohol, B. P. 75° C./100 mm., 125° C./755 mm. The 3,5-dinitrobenzoate and p-nitrobenzoate derivatives had melting points of 86.5 to 87.0° and 47.5 to 48.0° C., respectively.

*Preparation of omega-trifluoro-n-butyl bromide.*—Phosphorus tribromide (40.6 g., 0.15 mole) was placed in a round-bottom flask provided with a reflux condenser, calcium chloride drying tube, filling tube with pressure-equalizing connection and a stirrer. After the flask and contents had been cooled to 0° C. in an ice bath, 38.4 g. (0.3 mole) of omega-trifluoro-n-butyl alcohol was added dropwise over a one-hour period. The reaction temperature was raised about 10° per hour over a 10-hour period by heating with an oil bath after which the reaction mixture was cooled and poured into 500 ml. of ice water. The organic layer was washed with three portions of concentrated sulfuric acid; then by water until free of acid. The reaction mixtures from two such runs were combined, dried over anhydrous calcium sulfate, and distilled over phosphorous pentoxide to yield 106 g. (90% yield) of omega-trifluoro-n-butyl bromide, B. P. 104° C./755 mm.

*Preparation of 8,8,8-trifluoro-4-ketooctanoate.*—The Grignard reagent of omega-trifluoro-n-butyl bromide 42.9 g. (0.224 mole) was prepared in accordance with conventional practice excepting that a system capable of being operated in vacuo was used. The reaction product was cooled to 0° C. by immersing the flask in an ice bath after which 24.7 g. (0.135 mole) anhydrous cadmium chloride was added with stirring over a period of 20 minutes, utilizing a powder flask connected to the reaction vessel by means of wide rubber tubing. After the addition was completed, the mixture was agitated for the same period of time at 0° C. after which it was gently refluxed until the Gilman test indicated that the Grignard reagent had been completely converted to the organocadmium compound. The ether was then removed from the reaction mixture by distillation at atmospheric pressure until the rate of removal became slow at an oil bath temperature of 50° C. From a total quantity of 350 ml. of benzene in a dropping funnel, approximately one-half was added to the reaction mixture; the pressure within the flask was reduced to 100 mm. and the distillation continued until no ether remained in the reaction mixture, as indicated by an overhead temperature of 30° C. at the 100 mm. pressure. The remainder of the benzene was then added, and to ensure complete ether removal, an additional 20 ml. of liquid was distilled.

To the reaction mixture in benzene, cooled to 20° C., was added 36.3 g. (0.242 mole) of omega-carbomethoxypropionyl chloride dissolved in 50 ml. of benzene. Ice cooling was used to prevent the reaction temperature from rising above 40° C. When there was no longer any tendency for the reaction temperature to rise, sufficient heat was applied to maintain the reaction temperature at 35 to 40° C. for one hour, at 50 to 60° C. for another hour, and finally at reflux for about 30 minutes. The reaction product was cooled, and 200 g. of ice was added, followed by sufficient 20% sulfuric acid to produce two clear liquid phases. The aqueous phase was separated and extracted with two 50 ml. portions of benzene, and the combined extract was washed successively with 100 ml. of water and the same quantity of saturated sodium chloride solution after which it was dried over anhydrous calcium sulfate. The solvent was stripped and the residue distilled in vacuo through a 30 cm. Vigreux column to provide a 69% yield of keto-ester, B. P. 134 to 135° C./20 mm.

*Reduction of methyl 8,8,8-trifluoro-4-ketooctanoate.*—The Clemmensen reduction of the above keto-ester was carried out in a two-liter, three-necked flask fitted with a stirrer, dropping funnel, and condenser with the latter being sealed with a Dry Ice trap and a gas-washing bottle filled with petroleum ether having a boiling-point range from 65 to 110° C. The flask was charged with 300 g. of amalgamated, reagent-grade mossy zinc, 100 ml. of water, 240 ml. of concentrated hydrochloric acid and 93 g. (0.41 mole) of methyl 8,8,8-trifluoro-4-ketooctanoate. The mixture was heated to 120 to 130° C., and the reaction was continued for 112 hours, an additional 50 g. of zinc and 50 ml. of acid being added about every 24 hours during the period. After cooling, the reaction mixture was extracted with four portions of isooctane, and the combined extract was washed with water and then dried by azeotropic distillation with ethylene chloride. Fractionation of the dried material yielded two main fractions consisting of (1) omega-trifluorooctanoic acid 31.6 g. (72% yield based on converted keto-ester), B. P. 129° C./10 mm. and (2) 8,8,8-trifluoro-4-ketooctanoic acid, 36 g. having B. P. 136° C./2 mm.

EXAMPLE II (Omega-trifluorostearic acid)

As previously indicated, the sequence of steps essentially as described in Example I may be repeated on materials having a previously increased number of carbon atoms in the chain, thereby producing still higher members of the series having the aforementioned important surface-active properties. To illustrate this procedure, the synthesis of the $C_{18}$ compound, namely, omega-trifluorostearic acid, is described in detail utilizing the $C_8$ acid prepared as described in Example I and a different ester acid halide.

*Preparation of omega-trifluoro-n-octyl alcohol.*—Reduction of 16.3 g. (.082 mole) of omega-trifluorooctanoic acid with 6.9 g. of lithium aluminum hydride, following the procedure described for the preparation of omega-trifluoro-n-butyl alcohol in Example I, gave a yield of 12.3 g. (67%) of omega-trifluorooctyl alcohol, B. P. 130° C. at 10 mm.

*Preparation of omega-trifluoro-n-octyl bromide.*—Bromination of 12 g. (.065 mole) of the above alcohol was carried out using 9.3 g. of phosphorus tribromide in accordance with the procedure set forth in the preparation of omega-trifluoro-n-butyl bromide in Example 1. The crude product was fractionated in vacuo to yield 13.05 g. (89%) of omega-trifluoro-n-octyl bromide, B. P. 78 to 79° C. at 10 mm.

*Preparation of methyl 18,18,18-trifluoro-10-ketooctadecanoate.*—The method used in connection with the preparation of methyl 8,8,8-trifluoro-4-ketooctanoate from omega-trifluorobutyl bromide and omega-carbomethoxypropionyl chloride as described in Example I was essentially repeated excepting that the primary reactants used for preparing the desired intermediate designated above consisted of omega-trifluoro-n-octyl bromide and omega-carbomethoxynonanoyl chloride.

The latter reagent was prepared by refluxing a mixture of 600 g. (2.6 moles) of dimethyl sebacate, 127 g. (1.17 moles) of potassium hydroxide and 4.75 liters of absolute methanol until fresh samples did not show alkalinity when tested with phenolphthalein. After removal of the methanol under reduced pressure, the residue was distributed between water and ether. The aqueous extract was washed with ether and treated with excess hydrochloric acid and ether. The ether extract was washed and dried, and following removal of the solvent, a solid mixture consisting of the acid-ester and diacid was obtained. This was fractionated to yield 251 g. (1.2 moles) of methyl hydrogen sebacate as the main component, B. P. 132 to 135° C. at 0.3 mm.; neutral equivalent, found 219, theoretical 216. The purified product was warmed to 30 to 40° C. for 24 hours in the presence of 175 ml. (2.4 moles) of thionyl chloride after which the unreacted thionyl chloride was removed by co-distillation with benzene at a reduced pressure of 100 mm. The residual product was fractionated in vacuo to yield omega-carbomethoxynonanoyl chloride, B. P. 143° C. at 3.5 mm.

Bis-omega-trifluoro-n-octyl cadmium was prepared from 13.8 g. (.056 mole) of omega-trifluoro-n-octyl bromide via the Grignard reaction followed by the addition of the stoichiometric amount of anhydrous calcium chloride. To the organocadmium compound was added 15.4 g. (.05 mole) of omega-carbomethoxynonanoyl chloride. After working up the product as previously described for the preparation of the keto-ester in Example I, a fractionated product amounting to 15 g. (73% yield) of methyl 18,18,18-trifluoro-10-ketooctadecanoate was obtained having B. P. of 158 to 159° C. at 0.2 mm.

*Reduction of methyl 18,18,18-trifluoro-10-ketooctadecanoate.*—The Clemmensen reduction of the above-identified keto-ester was carried out, using hydrogen chloride in alcoholic solution, and a drying tube was also utilized to exclude moisture from the system. In other respects, the reaction was carried out as described in Example I under the preparation of omega-trifluorooctanoic acid. Dry hydrogen chloride was passed into 260 ml. of absolute alcohol cooled to 3° C. until saturated, and 130 g. of amalgamated mossy zinc and 13 g. of methyl 18,18,18-trifluoro-10-ketooctadecanoate were added thereto. The mixture was refluxed for a total period of 70 hours during which time the heating was interrupted about every 20 hours to resaturate the reaction mixture with hydrogen chloride and make additions of 50 g. of zinc. At the end of this period, the cooled reaction mixture was filtered and diluted with water. The water insoluble fraction was taken up in ether and combined with an isooctane extract of the aqueous fraction. After drying, the solvents were stripped under vacuum, and the residue was purified by a combination of fractionation in vacuo and recrystallization from 95% ethyl alcohol, yielding ethyl omega-trifluorostearate, M. P. 47.5 to 48.0° C.

The above ester was saponified in 0.5 g. batches by heating under reflux for 2 to 3 hours with 25 ml. of 10% alcoholic sodium hydroxide, the latter being prepared by dissolving metallic sodium in absolute alcohol followed by the addition of an equimolar quantity of water. At the end of the reaction, carried out under a nitrogen atmosphere, the alcohol was stripped under vacuum, and the residue was taken up in 50 ml. of distilled water. The product, omega-trifluorostearic acid, was precipitated by the slow addition of 12 ml. of concentrated hydrochloric acid. Each batch of product was recrystallized ten times from 95% ethyl alcohol and absolute methyl alcohol including at least one decolorization with charcoal (Norite). Five such batches were combined and dissolved in 85 ml. of absolute methyl alcohol, treated again with Norite and chilled to −40 to −50° C. The first crop of crystals was dried in a vacuum dessicator over calcium chloride and subjected to two additional recrystallizations from n-hexane which previously had been processed through alumina and silica gel. The yield of omega-trifluorostearic acid amounted to 2.1 g. (17.5%), M. P. 70.0 to 70.5° C., equivalent weight calculated 338, found 339.

EXAMPLE III (Omega-trifluorostearamide)

A ten-fold excess of thionyl chloride was added to 1.5 g. of omega-trifluorostearic and the resulting solution was stirred at room temperature for 20 hours and then heated to 35 to 45° C. for an additional seven hours. Unreacted thionyl chloride was partially removed by stripping to a distilland temperature of 110° C. and the remainder by co-distillation with three 50 ml. portions of benzene. The residue was dissolved in 50 ml. of chloroform, treated with 75 ml. of chloroform saturated with dry ammonia, and filtered. After washing the precipitate with water, the filtrate was shaken with aqueous ammonia. The chloroform solution was dried and evaporated to a residue. The residue and precipitate were combined and recrystallized from 95% ethyl alcohol to produce 1.31 g. (87% yield) of omega-trifluorostearamide, M. P. 103.5 to 104° C.

EXAMPLE IV

The long-chain aliphatic primary amines characterized by the omega-$CF_3$ group can be readily prepared from the corresponding amides. The preferred method for converting the carbonyl group to methylene consists of the use of an excess of lithium aluminum hydride prepared as an ether solution as described in Example I.

An extraction thimble containing the amide is placed in a wide-bore tube between the reaction flask and condenser. The ether solution containing about a ten-fold excess of the hydride is refluxed for a period of time sufficient to dissolve the amide. The excess lithium aluminum hydride is decomposed by the addition of ethyl acetate, and some water may also be used to ensure complete decomposition. A sufficient quantity of 20% aqueous sodium potassium tartrate is added to complex the aluminum in the reaction mixture. The ether layer is then separated, washed with water, dried and the ether removed by stripping or evaporation. The amine is finally purified, preferably by fractionation in vacuo. Extraction of the aqueous layer with solvents such as chloroform, etc. provide additional quantities of the crude amine which may be combined with the main fraction recovered from the ether layer.

As many embodiments of this invention may be made without departing from the spirit and scope thereof, it is to be understood that this invention is not limited to the specific embodiments thereof except as defined in the appended claims.

We claim:

1. In a process for preparing omega-trifluoroalkanoic acids containing from 6 to 22 carbon atoms in the hydrocarbyl radical from omega-trifluorobutyric acid, the steps of treating said acid with lithium aluminum hydride to reduce said acid to the corresponding alcohol, reacting said alcohol with phosphorus tribromide to form the omega-trifluorobutyl bromide, reacting the resulting omega-trifluorobutyl bromide with magnesium in ether to form the Grignard reagent thereof, reacting said reagent in the ether with anhydrous cadmium chloride to form the organocadmium compound and replacing the ether with benzene, reacting said organocadmium compound in the benzene with an ester acid halide having the type formula

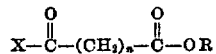

wherein X is a halogen atom, R is alkyl and $n$ is an integer from 1 to 16 to form the keto-ester condensation product.

2. The process as set forth in claim 1, wherein the ether is removed by distillation from the reaction mixture to a point short of dryness, benzene is added to the reaction mixture and the latter subjected to fractional distillation at reduced pressure to remove the remaining ether therefrom.

3. In a process of preparing an omega-trifluoroalkyl bromide having from 6 to 22 carbon atoms in the alkyl group from the corresponding alcohol and phosphorus tribromide, the improvement which comprises gradually adding the alcohol to the phosphorus tribromide at a temperature of about 0° C. and then gradually raising the temperature of the reaction mixture.

4. In a process of preparing a di(omega-triofluoroalkyl) cadmium compound from the Grignard reagent of an omega-trifluoroalkyl halide having from 6 to 22 carbon atoms in the alkyl group and anhydrous cadmium chloride in the presence of ether, the improvement which comprises distilling the ether from the reaction mixture to a point short of dryness, adding benzene to the reaction mixture and subjecting it to fractional distillation at reduced pressure to remove the remainder of the ether therefrom.

5. The process as set forth in claim 1, wherein said keto-ester is reduced to the corresponding omega-trifluoroalkanoic acid by means of amalgamated zinc and hydrochloric acid in water.

6. The process as set forth in claim 1, wherein the ester acid halide has the type formula $ClCO(CH_2)_nCOO$ alkyl in which $n$ is an integer from 3 to 12.

References Cited in the file of this patent

UNITED STATES PATENTS

| | | |
|---|---|---|
| 2,348,321 | Benning et al. | May 9, 1944 |
| 2,593,737 | Dresslin et al. | Apr. 22, 1952 |
| 2,691,043 | Husted et al. | Oct. 5, 1954 |

OTHER REFERENCES

McBee et al.: J. Am. Chem. Soc., 70, 2910–11 (1948).
Campbell et al.: J. A. C. S., 72, 4380–4384 (1950).